(12) United States Patent
Olson et al.

(10) Patent No.: US 6,626,660 B1
(45) Date of Patent: Sep. 30, 2003

(54) APPARATUS FOR PRODUCTION OF TWISTED BAKED GOODS

(75) Inventors: Gary Olson, Mukwonage, WI (US); Kevin Addesso, Muskego, WI (US); Brian Armstrong, Madison, WI (US); Wayne Krachtt, Cudahy, WI (US); Richard Heimbruch, Waunakee, WI (US); Michael Sutkay, Marshall, WI (US)

(73) Assignee: Baptista's Bakery, Inc., Franklin, WI (US)

( * ) Notice: Subject to any disclaimer, the term of this patent is extended or adjusted under 35 U.S.C. 154(b) by 0 days.

(21) Appl. No.: 09/711,199

(22) Filed: Nov. 10, 2000

Related U.S. Application Data

(60) Provisional application No. 60/198,331, filed on Apr. 19, 2000.

(51) Int. Cl.⁷ ............................. A23P 1/12; B29C 47/08
(52) U.S. Cl. .................... 425/190; 425/191; 425/192 R; 425/319; 425/381; 425/382 R; 425/464; 426/500; 426/516
(58) Field of Search ................................ 425/190, 191, 425/192 R, 319, 381, 382 R, 382.3, 464; 426/500, 516

(56) References Cited

U.S. PATENT DOCUMENTS

| | | |
|---|---|---|
| 1,714,234 A | 5/1929 | Ost |
| 2,000,384 A | 5/1935 | Frantz |
| 2,199,825 A | 5/1940 | Kretchmer |
| 2,712,291 A | 7/1955 | Groff |
| 2,856,868 A | 10/1958 | Kennedy |
| 2,926,482 A | 3/1960 | Hardesty |
| 3,038,418 A | 6/1962 | Gugler |
| 3,284,851 A | 11/1966 | Zernay |
| 3,522,777 A | 8/1970 | Schafer |
| 3,642,396 A | 2/1972 | Meneidis |
| 3,745,200 A | 7/1973 | Geyer |
| 3,993,422 A | 11/1976 | Riviere et al. |
| 4,129,979 A | 12/1978 | Hamel |
| 4,288,463 A | 9/1981 | Groff et al. |
| 4,445,838 A | 5/1984 | Groff |
| 4,451,414 A | 5/1984 | Rossiter |
| 4,504,511 A * | 3/1985 | Binley ..................... 264/209.2 |
| 4,767,638 A | 8/1988 | Uhrovic |
| 4,993,934 A | 2/1991 | Groff |
| 5,460,079 A * | 10/1995 | Bartow et al. ............... 425/319 |
| 5,492,706 A | 2/1996 | Cockings et al. |
| 5,494,428 A | 2/1996 | Piller |
| 5,518,749 A | 5/1996 | Weinstein |

(List continued on next page.)

Primary Examiner—James P. Mackey
Assistant Examiner—Joseph Leyson
(74) Attorney, Agent, or Firm—Hollander Law Firm, P.L.C.

(57) ABSTRACT

A fermented or yeast leavened dough is continuously fed to a plurality of nozzles and extruded and twisted into a plurality of continuous twisted dough ropes without substantially increasing the density of the dough. The dough is fed to the nozzles by an extruder or pump which supplies the dough at a substantially constant pressure without substantial surging of the dough. Each nozzle may produce a plurality of dough ropes which are twisted together to form a continuous twisted dough rope. By avoiding a substantial increase in dough density during extrusion and twisting, a hard, glassy texture in the baked product is avoided and a crispy, non-vitreous texture is achieved. The dough twisting apparatus includes a manifold having a plurality of dough passageways and extruder pipes which extend from the downstream ends of the dough passageways. A rotary die cup is mounted on each of the stationary extruder pipes. Each die cup contains one or more die orifices. The die cups are rotated about the central longitudinal axis of the extruder pipe. Rotation of each die cup twists the dough into a twisted dough rope upon exiting the die orifice of the die cup.

17 Claims, 10 Drawing Sheets

U.S. PATENT DOCUMENTS

| | | |
|---|---|---|
| 5,626,892 A | 5/1997 | Kehoe et al. |
| 5,670,185 A | 9/1997 | Heck et al. |
| 5,695,805 A | 12/1997 | Borek et al. |
| 5,820,911 A | 10/1998 | Morse et al. |
| 5,834,040 A | 11/1998 | Israel et al. |
| 5,874,120 A | 2/1999 | Borek et al. |
| D408,960 S | 5/1999 | Kauffman et al. |
| 5,906,485 A | 5/1999 | Groff et al. |
| 5,955,116 A | 9/1999 | Kehoe et al. |
| 5,955,118 A | 9/1999 | Powell |
| 6,306,323 B1 * | 10/2001 | Chu et al. .................. 264/105 |
| 6,450,796 B1 | 9/2002 | Groff et al. |

* cited by examiner

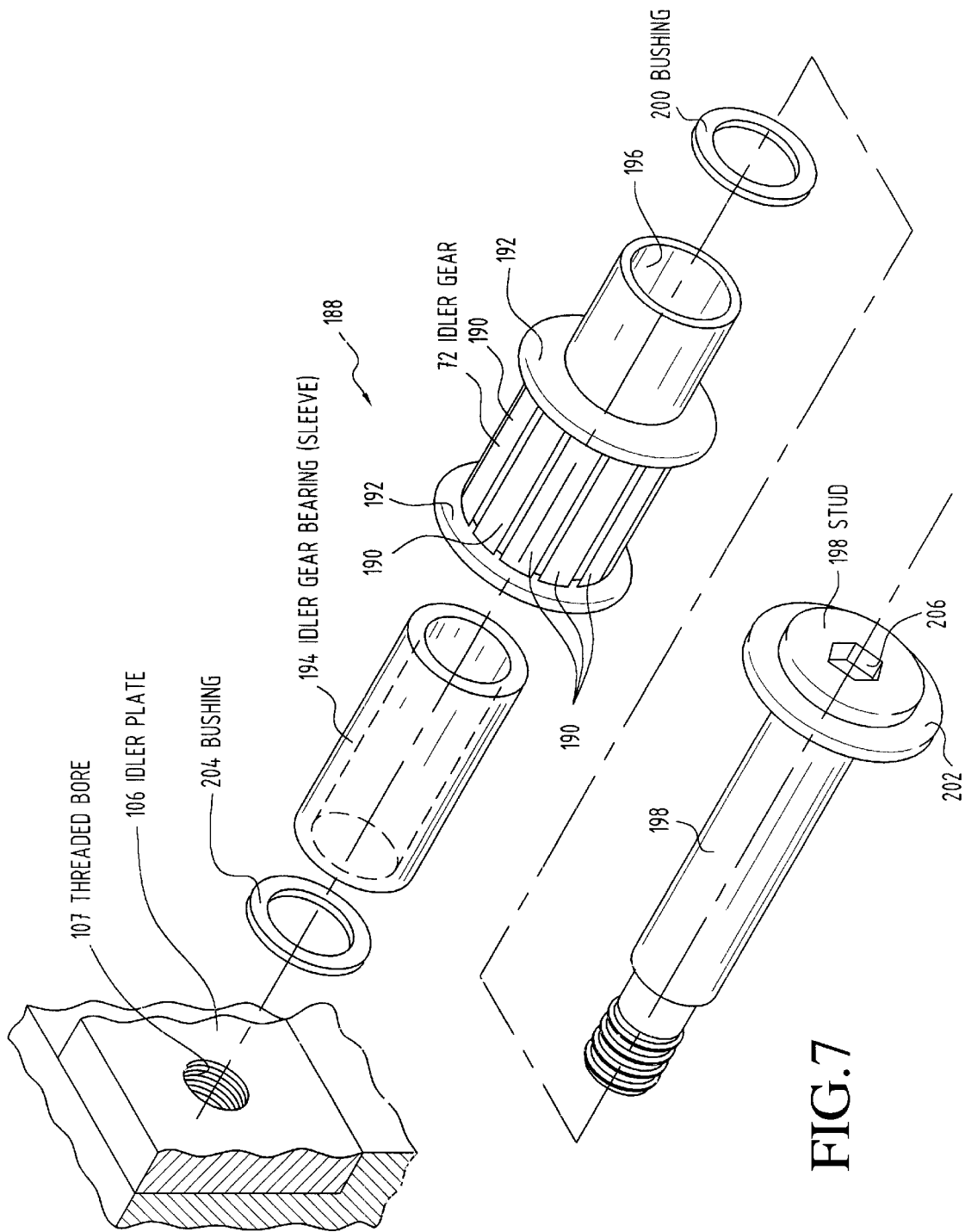

APPARATUS FOR PRODUCTION OF TWISTED BAKED GOODS

This application claims the benefit under 35 U.S.C. 119(e) of provisional application No. 60/198,331 filed Apr. 19, 2000 in the name of Gary Olson et al, for "Method and Apparatus for Production of Twisted Baked Goods," the disclosure of which is incorporated by reference in its entirety.

FIELD OF THE INVENTION

This invention relates to an apparatus and method for continuously producing a twisted baked good such as twisted breadsticks.

BACKGROUND OF THE INVENTION

In the production of twisted food products such as licorice, a licorice mass is heated to high temperatures to reduce viscosity of the licorice and to permit continuous extrusion of a twisted licorice rope through rotating nozzles. The production of twisted gum ropes is disclosed in U.S. Pat. Nos. 5,626,892 and 5,955,116 to Kehoe et al. Prior to twisting, heaters may be employed to control gum softness for extrusion, and for curing and sealing of the gum in a liquid additive injection zone of the gum extruder.

A braiding extruder for making braided products from extrusible material such as a dough or batter is disclosed in U.S. Pat. No. 5,834,040 to Israel et al. U.S. Pat. No. 5,695,805 to Borek et al discloses the production of ready-to-eat cereals and cereal-based snacks from multiple extrudate strands of cooked cereal dough that have been twisted or braided into ropes immediately after extrusion and severed into pieces.

U.S. Pat. No. 5,670,185 to Heck et al discloses an extrusion die assembly for preparing articles which are twisted and/or filled in their center with a filling, having one or more strands which are of a pasta-type or expanded cocktail snack-type. The extrusion die assembly comprises a thick body member which rotatably houses a barrel member which provides a tubular passage. The body member has an outlet channel for passage of a plasticized, especially edible, substance to the barrel member tubular passage which extends from a junction with the body member to at least one outlet channel. A rotary seal is provided at a junction between the body member and barrel member.

U.S. Pat. No. 4,288,463 to Groff et al discloses a method of making pretzels of a selected spiral pitch. Dough is extruded and the extrusion is rotated about an eccentric axis into a spiral configuration for baking. The extruded dough is gravitational passed to a conveyor belt. The vertical distance that the dough downwardly passes through is varied to change the wound spiral to a selected pitch.

U.S. Pat. No. 4,445,838 to Groff discloses an extrusion apparatus for practicing the method of U.S. Pat. No. 4,288,463 to Groff et al. The extrusion apparatus includes a pressure chamber having an outlet, a hollow extrusion die journaled in the outlet, and a hollow seal which is forced fit in the outlet. The hollow seal has a neck extending slidably into the hollow die. The neck and die combine to form a rotary seal for the comestible.

Traditional breadstick manufacture involves sheeting a dough, cutting the sheet into dough preforms, placing the dough preforms into pans, fermenting or proofing of the dough, and baking the fermented or proofed dough. During fermentation or proofing, gases are produced and flavor is developed. The gas production provides cell structure and porosity in the final baked product. Increasing gas production and leavening of the dough tends to result in a highly porous, large cell structure and oven rise which is characteristic of bread.

To produce a twisted breadstick or other fermented baked goods continuously, the use of heat to reduce dough viscosity for extrudability and twistability may destroy or kill the yeast prematurely. Loss of leavening or gas production and loss of flavor development may result from the premature destruction of the yeast. In addition, pressure buildup during extrusion and twisting may cause excessive frictional heating of the dough which may also destroy the yeast. Premature leavening may also result from excessive heating of chemically leavened, non-fermented doughs.

Degasification of the dough also results from excessive die pressures. Pressure variation and extruder surging may result in loss of shape definition in the extrudate. Reducing flow rates to reduce die pressures lowers production rates and increases dough lay time. Long lay times prior to extrusion and twisting, increase gas production and bubble size in the dough which can lead to substantial degasification of the dough during extrusion and twisting. Excessive degasification of the dough during extrusion and twisting results in an undesirable glassy, dense, hard texture rather than a crispy texture in the baked product.

The present invention provides a process and apparatus for making twisted breadsticks having a tender, crisp texture with excellent shape definition on a continuous production basis. The relatively viscous dough is supplied to the twisting nozzles at a substantially constant, low pressure. The process and apparatus avoids substantial dough surging and substantial dough degasification prior to and during extrusion and twisting which would result in undesirable variations in dough rope diameter and a hard, dense, glassy baked texture in the final product.

SUMMARY OF THE INVENTION

A twisted baked good is continuously produced by forming a dough, feeding the dough to a plurality of nozzles, and extruding the dough through the nozzles and twisting the dough into a plurality of continuous twisted dough ropes without substantially increasing the density of the dough. The twisted dough ropes may be cut into pieces and then baked. The dough may be a breadstick dough or other fermented dough, the density of which decreases with increasing lay time, or which increases with an increase in pressure. The dough may be fed to the nozzles by an extruder which supplies the dough at a substantially constant pressure without substantial surging of the dough. In preferred embodiments, the dough is fed to the plurality of nozzles by a pump which supplies the dough to the nozzles at a substantially constant pressure without substantial surging of the dough. The use of low, constant pressures, avoids substantial degasification of the dough which may be caused by a build-up of pressure at the extrusion and twisting nozzles. Also, the use of low pressures avoids heat build-up at the dies which would destroy yeast present in the fermenting dough. However, the pressure is sufficiently high so as to enable consistent, smooth lamellar, plug flow, non-turbulent extrusion and twisting of the dough through multiple nozzles and orifices into smooth surface dough ropes. In embodiments of the invention, the dough is fed to the nozzles at a pressure of less than about 200 psig, for example from about 85 psig to about 140 psig and at temperatures of less than about 110° F. Each nozzle may produce a single dough rope which is twisted about an axis. In preferred embodiments, each nozzle produces a plurality of dough ropes which are twisted together to form a continuous twisted dough rope.

The dough twisting apparatus or twist head device of the present invention includes a compression head or stuffbox for receiving a dough continuously from a pump or extruder. The compression head or housing flares outwardly and is mounted to a manifold plate by means of a flange mount. The manifold plate, upon which the compression head is mounted, contains a plurality of passages for receiving the dough from the compression head. The dough passageways are covered by the compression head or housing. The dough passageways are the widest at their upstream end at the upstream or receiving surface of the manifold plate so as to minimize dead areas on the manifold plate surface. The passageway may contain two internal chamfers, bevels or flares leading to a narrow, cylindrical passageway at the downstream or output end of the manifold plate. Each of the narrow, cylindrical passageways may contain a flow restrictor or adjustable bolt or valve for controlling or adjusting the flow through each passageway and each nozzle.

Into each outlet end or downstream end of the cylindrical passageway there is inserted an extruder pipe or stationary, hollow cylindrical shaft. The upstream end of the shaft is press fit and gas tungsten arc welded into the cylindrical passageway of the manifold plate so as to prevent leakage of the dough from the manifold plate and to assure passage of the dough through the interior hollow portion of the extruder pipe. A rotatable sleeved gear and plastic sleeve or bearing are inserted on the extruder pipe at its upstream end outside of the manifold plate. A plastic bushing may be inserted on the extruder pipe between the manifold plate and the rotatable gear to reduce frictional forces between the rotating gear and the manifold plate. The downstream portion of the gear may include screw threads for receiving a rotatable cup which is caused to rotate by rotation of the gear. A retaining ring which fits within a retaining ring groove on the extruder pipe prevents substantial movement or traveling of the rotary gear along the extruder pipe. A second bushing may be inserted on the extruder pipe downstream of the rotary drive gear to reduce frictional forces between the rotating gear and the retaining ring and to also prevent traveling of the rotary gear along the extruder pipe.

The rotatable cup includes internal screw threads for engagement with the external screw threads of the rotatable gear. The length of the rotatable cup is sufficiently long so that when the cup is securely screwed on to the rotatable gear, the downstream end of the cup extends a substantial distance beyond the end of the stationary extruder pipe so as to provide a head space within the die cup. The dough passes through the extruder pipe and out of its downstream end into the head space. The dough flows from the head space through a die hole located at the downstream end of the cup. The die hole may be provided in the end of the cup or may be present in a die insert which is held in the downstream end of the cup. One or more rubber or plastic ring seals may be provided within one or more grooves on the outer surface of the extruder pipe. The rubber ring seal helps to prevent back flow of dough between the outer surface of the extruder pipe and the inner surface of the rotatable cup back towards the gear.

Rotation of the die cup around the stationary extruder pipe, results in rotation of the die insert and die opening about the longitudinal axis of the die cup and die insert. Rotation of the die opening as the dough is extruded therethrough results in rotation of the dough as it passes through and as it passes out of the die hole.

A plurality of the rotatable gears are driven continuously and in synchronization by means of a geared belt. The geared belt is driven by a motor. The motor may be mounted on an adjustable slide plate which can be adjusted or moved to increase or decrease belt tension. The rotatable nozzles may be arranged in one or more rows. The rotatable nozzles may be arranged in two rows interstitially and driven by the same geared belt. Rotatable tensioners may be mounted or screwed into upper and lower plates of the twisting head. Each tensioner includes a rotatable sleeve gear mounted upon a non-rotatable shaft. A plastic sleeve or bearing may be employed to provide a smooth, low friction surface between the interior of the gear and the exterior of the stationary shaft. The tensioners may be located at interstitial positions above the upper row of rotatable nozzles and the lower row of rotatable nozzles. The geared drive belt may pass between the rotatable gears of the nozzles and the rotatable gears of the tensioners. The arrangement avoids contact of dough and build up of dough on the gears and avoids pulsation, surging, and the production of uneven diameter ropes.

The die insert or cup end may include one or more die holes or slots for producing a variety of twisted dough ropes. The die openings may be circular, rectangular, square, oval, straight, Z-shaped, or the like. In preferred embodiments, each die insert or cup includes three circular openings, the middle of which has its center at the longitudinal axis or rotational axis of the nozzle or cup. The remaining two circular die openings may be arranged so that the centers of the openings fall on a straight line. Upon rotation of the cup and die openings, three separate ropes are formed which form a single dough rope having a distinct, twisted appearance. The two outermost ropes twist around the inner or central rope and generally expand to a greater extent that the inner rope. The twisted dough rope contains distinctively visible peaks and valleys which are also present in the final baked product. The peaks and valleys provide an attractive variation in browning, with the peaks browning more than the valleys thereby providing a three-dimensional appearance. Three distinct ropes are visible on the outer surface of the baked product but the ropes are adhered together so that upon breaking of the pieces or eating of the pieces, the ropes do not separate or delaminate.

BRIEF DESCRIPTION OF THE DRAWINGS

FIG. 7 is an exploded, perspective view of an idle sprocket assembly for the twist head apparatus of the present invention.

DETAILED DESCRIPTION OF THE INVENTION

Figure 1:
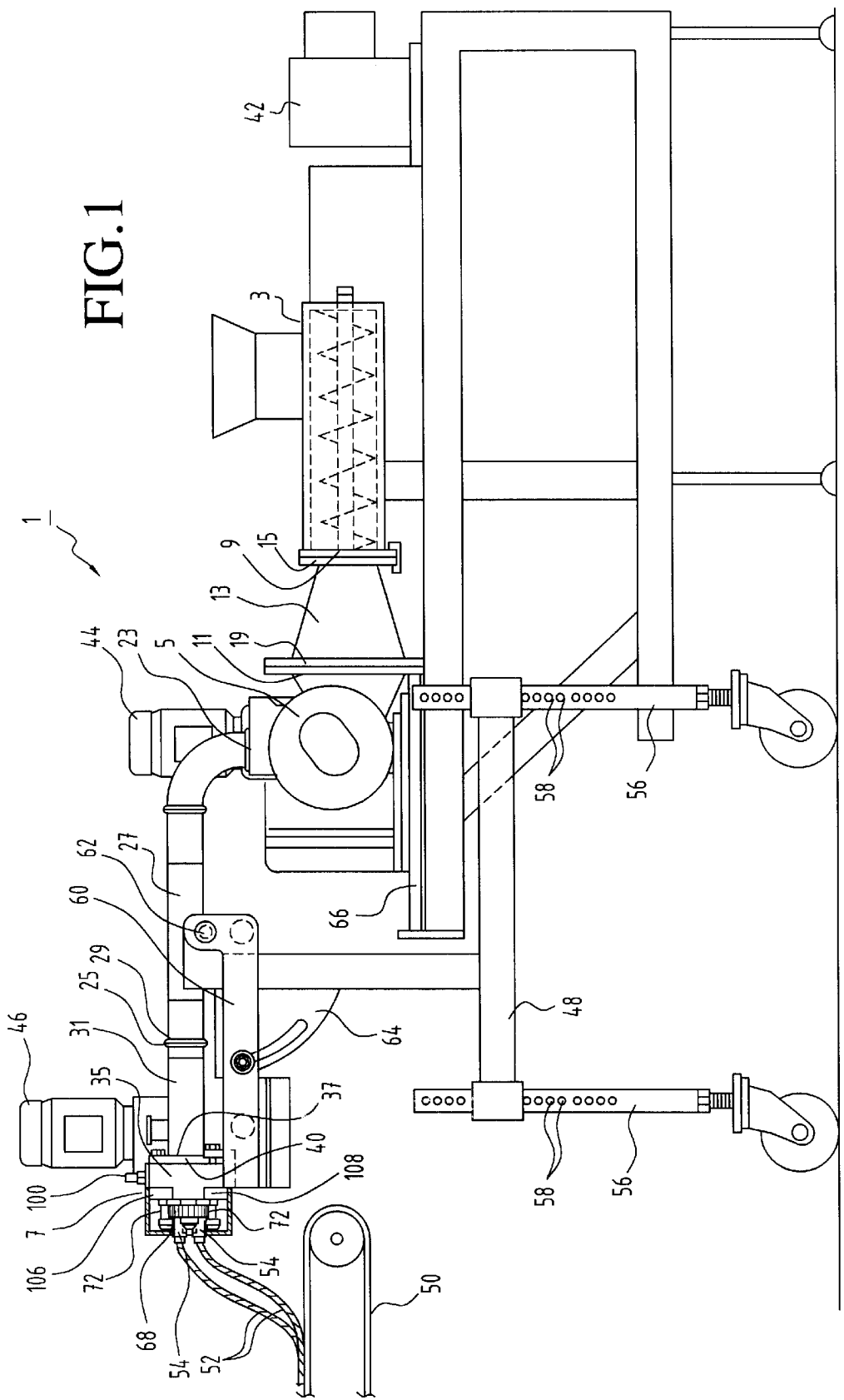
FIG. 1 is a side view of apparatus for producing twisted dough ropes in accordance with the present invention.

The apparatus of the present invention supplies dough to a twist head which extrudes and twists the dough into twisted dough ropes without substantially destroying the gluten network or structure of the dough so as to substantially maintain fine, substantially uniformly sized bubble cells in the dough. The apparatus is designed to minimize or at least substantially eliminate void spaces in the apparatus and dwell time of the dough in the apparatus so as to avoid structural collapse or destruction of the cell structure of the dough. The structural collapse or destruction of the cell structure is manifest in a substantial increase in density of the dough exiting from the twisting nozzles. The structural collapse also results in an undesirable hard, glassy, gritty texture in the baked product rather than a crisp, non-vitreous substantially homogeneous texture as exhibited by the products of the present invention. Also, the products produced using the process and apparatus of the present invention exhibit a substantially homogeneous cellular appearance rather than a substantially non-cellular structure having substantially large void spaces. The dough is conveyed under pressure to the twist head assembly using a relatively low, constant pressure which is sufficient to positively convey the dough to and through the twist head assembly without damaging the dough.

The dough may be produced batchwise or continuously in conventional manner. A continuously mixed dough is preferred so that many fine, uniform sized bubble cells are present in the dough. The dough may be chemically leavened or a yeast leavened or fermented dough. The fermented dough may be produced using a conventional sponge and dough-up stage. Fermented doughs are preferred for flavor development and production of a crisp, fine cell structure and crisp texture.

The dough may be fed to a hopper of a low pressure, continuous mixer, screw conveyor, or extruder for conveyance of the dough to the twist head assembly. The continuous mixer, screw conveyor or extruder may contain one or more screws. When two screws are employed, they may be non-intermeshing or intermeshing. These devices may be employed to directly feed the dough to the twist head provided they can provide sufficient pressure to pass the dough through the plurality of twisting nozzles without substantial surging and without substantial destruction of the cell structure of the dough.

For direct transport of the dough to the twist head assembly without the use of a pump, a low shear continuous mixer with separately housed screws may be employed. The separately housed screws may serve to build up sufficient pressure in the twist head assembly housing so as to obtain consistent flow out of the twist head assembly which is gentle enough so that it does not destroy the gluten network.

In preferred embodiments of the present invention a pump is employed to feed or pump the dough directly into the twist head assembly. Thus, a continuous mixer, a forming extruder or screw or auger may be employed to feed the dough into the pump which in turn pumps the dough at a constant pressure to the twist head assembly without surging. Pumps which run at low rpms while still creating a constant pressure which is sufficient to pass the dough through the twist head assembly without damaging the dough may be employed. Positive displacement pumps, such as a SINE pump, may be employed. An example of a pump which may be employed for pumping of a fermented dough in accordance with the present invention is a SINE pump Model MF135-NNFES. In preferred embodiments, the dough is transferred from the extruder through the SINE pump and to the twisting head nozzle in a substantially straight line or in-line path rather than in a path which employs substantial bends, such as 90° bends, which would tend to result in pressure build-up and surging.

The dough temperatures in the continuous mixer, extruder, or forming extruder, and in the pump and twist head are generally such so as to avoid gelatinization of the dough and avoid killing of yeast in fermented doughs. Generally, yeast are killed at about 110° F. Accordingly, dough processing temperatures prior to baking are generally less than about 110° F., preferably from about 75° F. to about 105° F. In embodiments of the invention, continuously produced fermented doughs may have a temperature of from about 70° F. to about 95° F., preferably from about 75° F. to about 90° F. The dough temperature may generally increase up to about 5° to about 10° in the continuous mixer or extruder. The dough temperature may increase up to about 5° to about 10° through the pump. The temperature of the dough at the manifold going into the twist head assembly may, for example, range from about 80° F. to about 105° F., preferably from about 85° F. to about 100° F. The temperature of the dough leaving the twist head assembly is generally less than about 110° F., preferably less than about 105° F.

The pressure at the manifold feeding the twist head assembly is generally less than about 200 psig, and may range, for example, from about 85 psig to about 140 psig.

The density of the finished dough, before it is permitted to lay or age may range from about 0.85 g/cc to about 1.3 g/cc, preferably from about 0.9 g/cc to about 1.15 g/cc. A completely non-aerated dough may have a density of about 1.3 g/cc. As the dough is permitted to lay or age, the density of the dough decreases as the dough continues to ferment and as gases expand already existing air cells. For example, after the lay time of about 55 minutes, the dough density may decrease from about 1.1 g/cm$^3$ down to about 0.7 g/cm$^3$. If the dough density is too low when it is extruded and twisted into ropes, mechanical cell rupture in the dough, glassification or vitrification and substantial destruction of the cell structure in the final product all tend to occur. Doughs wherein mechanical cell rupture has occurred so as to result in vitrification of the final baked product exhibit a dough density substantially greater than the density of the dough prior to being subjected to extrusion and twisting. For example, a dough with a density of about 0.7 prior to extrusion and twisting may have a dough density of greater than about 1.2 g/cm$^3$ after extrusion and twisting and upon baking results in a glassy, hard texture.

In accordance with the present invention, a dough whose density decreases with increasing lay time or which increases with an increase in pressure is extruded through the rotating nozzles and twisted without substantially increasing the density of the dough. In accordance with the present invention, the dough density upon extrusion and twisting may, for example, increase, for example, less than about 35%, preferably less than about 20%, most preferably less than about 10%, based upon density of the dough prior to extrusion and twisting.

Dough density may be measured using conventional methods and equipment. In embodiments of the invention, dough density may be determined by the use of a wire basket. The wire basket may be hung from the underside of a balance by means of a monofilament line. The basket may be weighed in a fluid, such as oil, of known density (for example 0.85 g/cm$^3$). The basket may then be blotted with a cloth to remove excess oil and then reweighed in air. After weighing in air, a dough sample may be placed in the basket and the dough-filled basket weight in air may then be recorded. The dough-filled basket may then be submerged in the oil, and the weight again recorded. The dough density may be determined using Archimedes principle. The formula for determining the dough density where the fluid is oil is: $\rho = W_{air}/[(W_{air}-W_{oil})]/\rho_{oil}$ wherein $\rho$=density of the dough, $W_{air}$=weight of the dough in air, $W_{oil}$=weight of the dough in oil, and $\rho_{oil}$=density of the fluid, such as oil.

In embodiments of the invention, bubble cell sizes in the dough generally decrease in size and the bubble size becomes more uniform upon extrusion and twisting of the dough. For example, a breadstick dough prior to extrusion may have bubble cell sizes in the range of about 11 microns to about 430 microns, preferably from about 100 microns to about 150 microns, for example about 125 microns. After extrusion and twisting, the bubble cell sizes may be in the range of about 13 microns to about 150 microns, preferably from about 45 microns to about 140 microns, for example, about 130 microns.

Bubble cell size prior to extrusion and twisting may be controlled, for example, by the amount of lay time or aging prior to extrusion. In embodiments of the invention, the dough may be permitted to lay or aged for zero up to about 25 minutes, preferably less than about 12 minutes, prior to extrusion.

The mass flow rate of the dough through the die holes should be such that each dough strand diameter may be between about 0.190 inch and about 0.250 inch, preferably about 0.220 inch.

The extruded and twisted dough may be permitted to proof for a time period of up to about 50 minutes, preferably between about 5 minutes and 20 minutes, more preferably about 7 minutes to about 15 minutes, for example about 12 minutes, at a temperature of between about 80° F. and about 105° F., preferably from about 85° F. to about 95° F., for example, about 90° F., at a relatively humidity between about 60% and 90%, preferably about 80% to about 85%.

The strand diameters may increase in volume by, for example, up to about 40%. For example, in embodiments of the invention, the dough strand diameters may be approximately from about 0.26 inch to about 0.35 inch in diameter.

The rotational speed of the nozzles may be operated to obtain a range of desired shapes. For example, increasing the rotational speed increases the number of twists per given length of extrudate rope. In embodiments of the invention, strands may be twisted in such a fashion that their pitch or periodicity of the highest point where each rope's diameters align on top of one another, is about 0.625 inch to about 1.50 inches, for example from about 0.85 inch to about 1.25 inches, preferably about 1.0 inch in length.

In preferred embodiments of the invention, water is sprayed on the tops of the twisted dough ropes immediately after proofing and prior to baking to help retain the twisted or desired shape. It is believed that the water spray prior to baking helps to limit oven spring or expansion during the initial stage of baking until surface gelatinization can be achieved. This retains the twisted shape and avoids creation of a uniform or cylindrical cross-section. Spraying with an oil or fat prior to baking or steaming in the oven may also be employed to reduce oven spring and retain a desired twisted shape.

In embodiments of the invention, no significant moisture loss from the dough is exhibited as it exits the die orifices. Expansion of the dough out of the die orifice may range up to about 75%, for example, from about 15% to about 70%, compared to the diameter of the die orifice.

The twisted dough strands may be conveyed on a conveyor belt to the oven. The dough strands may be cut into pieces using conventional cutting devices, such as a guillotine-type cutter, a reciprocating cutter, or a rotary cutter. The twisted dough strands may be cut into lengths ranging, for example, from about 0.75 inch to about 15 inches, preferably from about 4 inches to about 8 inches in length.

In preferred embodiments of the invention, a hard, red spring flour with a protein content of about 10% by weight to about 14% by weight, preferably about 12% by weight, is employed. A portion of the flour, for example, about 40% by weight of the flour may be prefermented in a liquid sponge.

The final dough moisture content, which includes added water and any water present in the ingredients such as the flour, yeast, sugars, etc., may range from about 25% by weight to about 45% by weight, preferably from about 30% by weight to about 35% by weight, based upon the weight of the final dough subjected to extrusion and twisting. Generally, the amount of added water may range from about 20% by weight to about 40% by weight, preferably from about 25% by weight to about 35% by weight, based upon the weight of the final dough subjected to extrusion and twisting. If the dough moisture content is too low, high extrusion pressures tend to result and mechanical cell rupture tends to be hastened. If the dough moisture content is too high, the extruded dough shape tends to be less well defined.

In preferred embodiments, one or more emulsifiers may be employed in the doughs. The emulsifiers tend to delay mechanical cell rupture. They tend to impart a finer cell structure leading to smaller initial gas cells which lengthens the amount of time before mechanical cell rupture results. It is believed that the emulsifiers complex with components in the dough such as water and starch and lipids. They facilitate the use of lower pressures, increase mixing tolerance and gas retention, and generally tend to provide a more tender texture in the baked product. Exemplary of emulsifiers which may be employed are sodium stearoyl lactylate (SSL), distilled mono-diglycerides, polysorbates, ethoxylated mono-glycerides, diacetyltartaric acid esters of mono-glycerides, lecithin, and the like. In preferred embodiments, a mixture of sodium stearoyl lactylate (SSL) and distilled mono-diglycerides may be employed. Exemplary amounts of the emulsifiers may range from about 0.1% to about 0.5% by weight for each emulsifier, based upon the weight of the flour.

Exemplary baking temperatures which may be employed are from about 300° F. to about 600° F. Exemplary baking times for use in the present invention may be from about 2 minutes to about 15 minutes, preferably from about 10 minutes to about 14 minutes.

In accordance with the present invention, a wide variety of twisted shapes may be achieved in baked goods such as breadsticks, pretzels, ready-to-eat cereals, snacks, and the like on a mass production basis by employing different die cups or die inserts.

Each die cup or die insert for each nozzle may have one or more die orifices or die holes through which the dough is extruded. The orifices may be in the shape of a circle, slit, cross or X, Y, Z, S, a plus sign (+), or the like. Where a plurality of circular orifices are employed, they may be arranged in a line, along a diameter of a circular die insert, for example. In other embodiments, the circular orifices may be arranged in a triangular pattern, for example, three orifices may be arranged at the apices of an equilateral triangle. The centers of the one or more circular die orifices may each be eccentric to the axis of rotation of the die insert or die cup. In other embodiments, the center of one of a plurality of die orifices may be at least substantially aligned with the axis of rotation of the die insert or die cup. The slotted orifices, or dies, X-shaped, Y-shaped, or S-shaped, or Z-shaped die orifices may also have their central rotational axis or center point at least substantially aligned or coincident with the axis of rotation of the die insert or die cup.

In other embodiments, one or more slotted die orifices may be completely eccentric to the rotational axis of the die insert or die cup. For example, one or more slot-shaped die orifices may extend from the periphery of a circular die insert along one or more radii of the die insert but stop short of the central, rotational axis of the die insert. Preferred die orifice embodiments include three-hole dies, with the three die orifices arranged linearly, and the central circular die orifice having its center at least substantially coinciding with the central, rotational axis of the die insert or die cup.

In another preferred embodiment, three die orifice holes are arranged at the apices of an equilateral triangle, the center of each die orifice being approximately equally spaced from the central rotational axis of the die insert or die cup.

In another preferred embodiment, five die orifices are employed, with one of the orifices having its center at least substantially aligned with the central rotational axis of the die insert or die cup. The remaining four die orifices may be arranged so that their centers are located at the corner of a square and are equally spaced from the central rotational axis of the die insert or die cup.

In another preferred embodiment, a single slotted die orifice having rounded or circular ends may have its central axis at least substantially aligned with the central rotational axis of the die insert or die cup. In another preferred embodiment, an x-shaped die orifice may have its central axis or the intersection of two angled slotted orifices located at the central rotational axis of the die insert or die cup.

In preferred embodiments, the die orifices may extend from the downstream end or outlet end straight towards the inlet end or upstream end through a substantial distance and then flare outwardly towards and to the inlet end. The use of a die insert which is thusly wider at the upstream or inlet end helps to reduce back pressures and dead space and promotes a smooth, lamellar flow through the die orifice. In embodiments of the invention, the entire periphery of the upstream end of each orifice may be tapered or chamfered or only a portion of the periphery may be tapered, chamfered or flared. For example, for circular die orifices, the entire inner periphery may be tapered or angled. For slotted die orifices, S-shaped, Z-shaped, or X-shaped orifices, only the end portions of the slots may be tapered or flared at the upstream or input end of the die orifice.

The die cup or insert cup may have a wide, upstream bore and a narrower, downstream bore thereby creating an internal ridge. The ridge may contain an inner flare, chamfer, or taper which narrows or transitions into the downstream narrow bore. An internal screw thread may be provided at the upstream end of the die cup or die insert cup for securing the cup to a rotary drive gear. The internal screw thread may extend from the upstream end of the die cup only a partial distance along the inner, upstream bore of the die cup. For example, the internal thread may extend to about the midway point between the upstream end of the die cup and the inner ridge. The inner ridge may be employed to support or mount a low friction seal ring or retaining ring. The extruder tube may extend past the ridge and a partial distance into the downstream, narrow bore, and terminate a substantial distance from the outlet end of the die cup or insert cup. For example, the extruder pipe or tube may terminate at an about intermediate position between the inner ridge or inlet end of the downstream bore and the outlet end of the downstream bore or insert cup or die cup. In other embodiments, the extruder pipe may terminate further upstream or further downstream than the intermediate position while leaving a head space between its end and the inlet to the die orifice.

The outlet end of the insert cup may include an internal ridge for receiving and retaining a die insert. The die insert may be inserted into the insert cup from the upstream or inlet end of the cup and then press-fit into the narrow bore for abutting engagement with the downstream ridge. The ridge prevents the outward flow of the die insert as the dough flows through the die orifices. The inner diameter of the downstream bore is substantially equal to or only slightly larger than the diameter of the die insert so that the die insert may be easily inserted into the downstream bore and securely held in abutting relationship against the downstream ridge.

The die insert cup or die cup may include opposing peripheral flat surfaces for receiving a wrench for tightening or removal of the die cup with respect to the rotary drive gear.

The die orifice diameters may, for example, range from about 1 mm to about 8 mm, preferably from about 2 mm to about 5 mm. Die slot widths may range, for example, from about 1 mm to about 6 mm, preferably from about 2 mm to about 4 mm, for straight slots or curvilinear slots, such as S-shaped slots, rectangular slots, Z-shaped slots, X-shaped slots, and the like. Die slot lengths for straight or rectangular slots may range, for example, from about 8 mm to about 18 mm in length. For example, in embodiments of the invention, a substantially centrally located single slot die may have a width or smaller dimension of about 3.18 mm and a length, or larger dimension of about 11.71 mm. Each end of the slot may be rounded. In preferred embodiments of the invention, a three-hole die, with each hole diameter being about 0.173 inches and with the holes being spaced about 0.192 inches apart, center to center, may be employed.

Where flared inlet orifices are employed, the taper angle may range, for example, from about 25° to about 45°. The flare or taper may extend, for example, up to about 70% of the thickness of the die insert.

Figure 2:
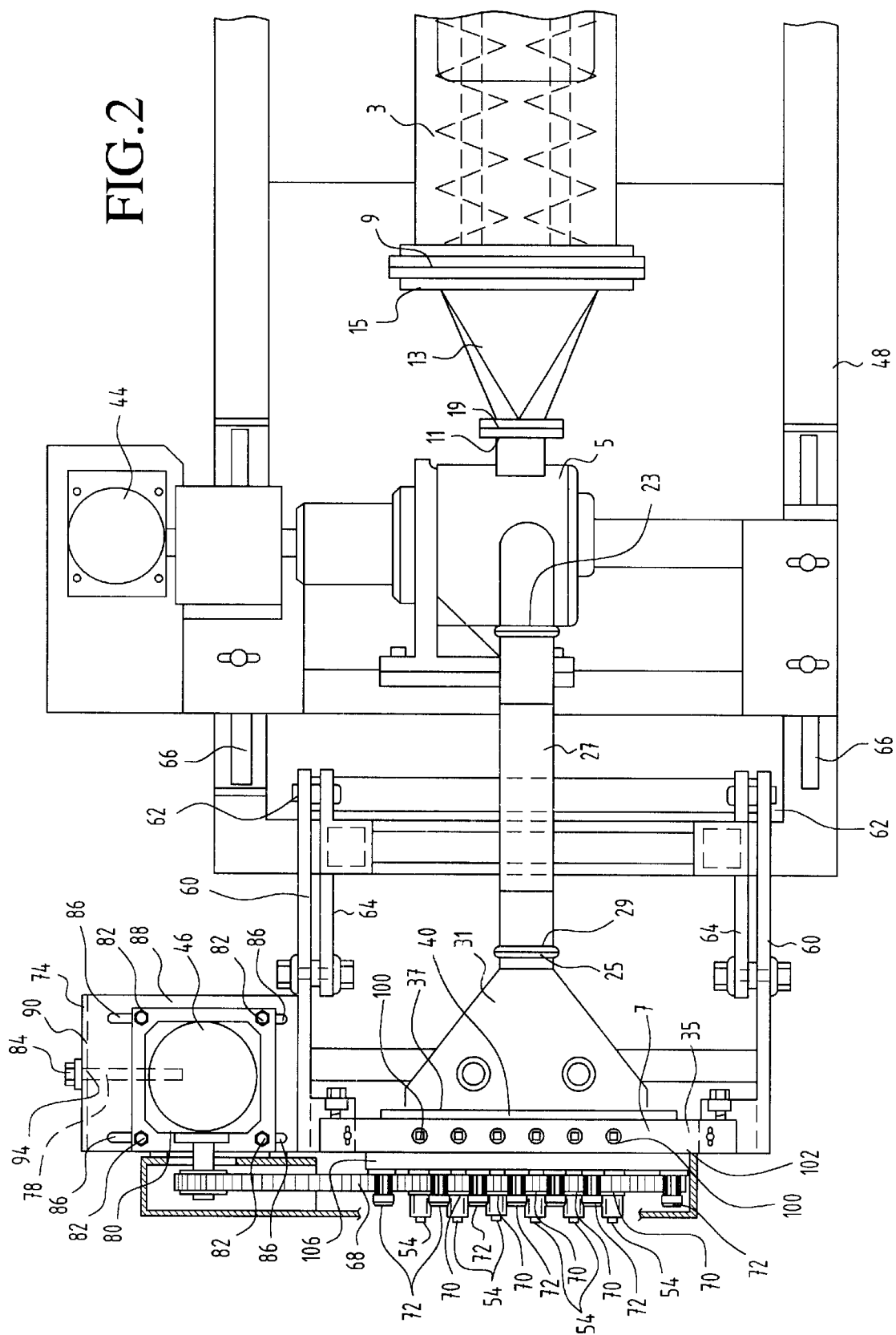
FIG. 2 is a top view of the apparatus of FIG. 1.
Figure 3:
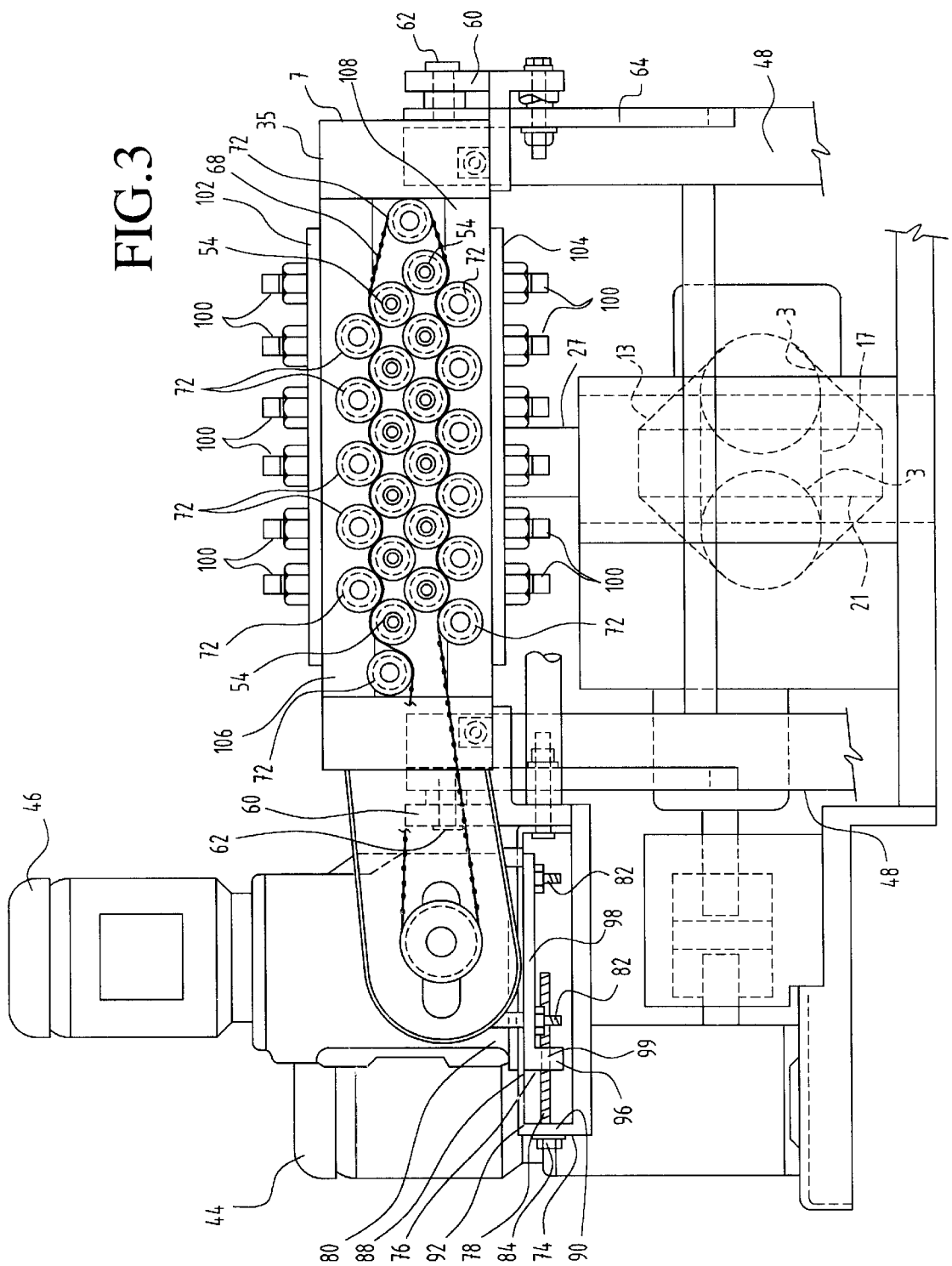
FIG. 3 is a front view of the apparatus of FIG. 1.

Apparatus which may be employed for producing the twisted breadsticks in accordance with the present invention is shown in FIGS. 1, 2, and 3. The apparatus 1 includes a twin screw conveying device 3, a positive displacement pump 5, and a twist head device 7. The output end or downstream end 9 of the dough conveying device 3 is connected to the input end 11 of the pump 5 by means of a pump transition conduit 13. The upstream end 15 of the pump transition conduit 13 may have a substantially horizontally oriented rectangular opening 17 for communication with the outlet opening in the extrusion conveying device 3. The outlet end 19 of the transition 13 may have a substantially vertically oriented rectangular opening 21 for communication with the inlet opening of the pump 5. The output end 23 of the pump 5 is connected to the input end 25 of the twist head apparatus 7 by means of a conduit or pipe 27. The conduit 27 may be completely flexible or partially flexible to enable angling of the twist head apparatus 7 upwardly and downwardly. The output end 29 of the conduit 27 may be connected to the input end 25 of an extruder transition conduit 31 or compression head or stuffbox. The extruder transition conduit 31 flares or angles outwardly in the downstream direction for feeding of a plurality of bores or conduits in a manifold plate 35 of the twist head apparatus 7. The downstream end 37 of the extruder transition conduit 31 may be mounted to a flange mount 40 of the twist head apparatus 7. The flange mount 40 may be bolted or otherwise secured to the manifold plate 35.

The dough conveying auger or extruder 3, the pump 5, and the twist head apparatus 7 may each be separately driven by separate conventional motors, 42, 44, and 46, respectively. The twist head 7, pump 5, and conveying extruder 3 and their respective motors 42, 44, and 46 may be mounted on or carried on a movable cart or frame assembly 48 for positioning of the twist head 7 with respect to a conveyor 50 for conveying the twisted dough ropes 52 as they exit the nozzles 54 of the twist head 7. The cart or support frame 48 may include wheeled legs or supports 56 which are adjustable vertically by means of adjustment holes 58. The twist head assembly 7 may be mounted upon an adjustable bracket portion 60 of the cart 48. The bracket or frame 60 may be pivoted about a pivot 62 and secured in a desired position by means of a web support 64. The adjustable bracket 60 permits angling of the twist head 7, for example, up to about 30° with respect to the horizontal for adjusting the distance traveled by the extruder ropes 52 before contacting the twisted dough rope conveyor 50. The pump 5 and its motor 44 may also be mounted on a slidable bracket or support 66 for movement or adjustment in the upstream or downstream direction.

As shown in FIGS. 1, 2 and 3, the twist head apparatus 7 may include a plurality of rotatable nozzles 54 aligned interstitially in a plurality of rows across the width of the twist head apparatus 7. The interstitial arrangement of the rotating nozzles 54 permits extrusion of twisted dough ropes 52 from each nozzle 54 without the twisted dough rope 52 from each nozzle 54 interfering with or intertwining with the twisted dough rope 52 from an adjacent nozzle 54. The rotating nozzles 54 are driven by a notched drive belt 68 which engages gear drive sprockets 70 of each nozzle 54. The drive belt 68 is driven by the twist head motor 46. Idler gear sprockets 72 are provided for engagement, tensioning, and guidance of the belt 68 with respect to the gear sprockets 70 of the rotating nozzles 54. The idler sprockets 72 may be arranged in a row above the top row of nozzles 54 and below the bottom row of nozzles 54. The top row of idler sprockets 72 may be arranged interstitially with the top row of rotary nozzles 54 with each idler sprocket 72 being substantially vertically aligned with a bottom row nozzle 54. Similarly, the bottom row of idler sprockets 72 may be interstitially arranged with respect to the bottom row of rotating nozzles 54 with each bottom row idler sprocket 72 being substantially vertically aligned with a top row rotating nozzle 54. A rotating idler sprocket 72 may also be provided at both ends of the rows of rotating nozzles to provide guidance and tensioning of the drive belt 68. The nozzles 54 and drive belt 68 may be rotated clockwise or counter-clockwise.

In addition, as shown in FIGS. 2 and 3 a belt tensioning device 74 may separately be used to adjust tension of the belt 68. The belt tensioning device 74 may include a motor mounting slide plate 76 with a screw type adjustment 78 for moving, sliding or adjusting the slide plate 76 along with the attached twist head motor 46 and gear box 80. The slide plate 76 may be removably attached to the bottom of the gear box 80 of the twist head motor 46 using four gear box bolts 82.

The tensioning or slide plate 76 can be adjusted inwardly, or toward the twist head nozzles 54 to relieve tension. Outward adjustment, or movement of the slide plate 76 away from the twist head nozzles 54 increases tension of the twist head drive belt 68. The slide plate 76 may be moved, adjusted, or slid by turning a tensioning adjustment bolt or screw 84 so that the gear box 80 can move within four slotted areas 86 of a support plate 88. The support plate 88 may include a vertical section 90 through which the tensioning adjustment bolt 84 passes, and a horizontal section 92 upon which the gear box 80 and twist head motor 46 rest. The hole 94 in the vertical section 90 through which the adjustment bolt 84 passes may be threadless. The horizontal section may include a plurality of slots 86, e.g. two or four slots, through which four bolts 82 pass for attachment to the bottom of the gear box 80.

The slide plate 76 may also have a vertical section 96 and a horizontal section 98. The vertical section 96 of the slide plate 76 may have a threaded hole 99 for threaded engagement with the threads of the adjustment bolt or screw 84. The slide plate 76 may be located beneath the support plate 88, with the top surface of the slide plate 76 being in opposition or in contact with the bottom surface of the support plate 88. The four gear box bolts 82 pass through four holes in the slide plate 76, then through the four slots 86 in the support plate 88, and then into the bottom of the gear box 80. Turning the head of the adjustment screw or bolt 84 causes or permits movement of the slide plate 76, gear box bolts 82, gear box 80 and motor 46 relative to the stationary support plate 88 as the gear box bolts 82 are permitted to move within and along the slots 86 in the support plate 88.

The twist head apparatus 7 includes a horn assembly or manifold plate 35 upon which the rotating nozzles 54 are mounted. A top row of flow restrictors or bolts 100 enter the top of the manifold plate or horn assembly 35 for controlling the flow of dough to each rotating nozzle 54. Similarly, a bottom row of flow restrictors or bolts 100 enter the bottom of the manifold plate or horn assembly 35 to control or adjust the flow of dough to the bottom row of rotating nozzles 54. A top valve plate 102 may be mounted on the top of the manifold plate or horn assembly 35. Similarly, a bottom valve plate 104 may be mounted to the bottom of the manifold plate or horn assembly 35. The top and the bottom valve plates 102, 104 may be bolted together through the manifold plate 35. The flow restrictors or valves 100 pass through the valve plates 102, 104 into the manifold plate 35.

A top idler plate 106 and a bottom idler plate 108 may be mounted or bolted to the output end or face of the horn assembly or mounting plate 35. The top and bottom rows of idler sprockets 72 may be secured or mounted to the idler plates 106, 108 by, for example, screwing of the idler sprockets 72 into a threaded bore 107 in the idler plates 106, 108. Each of the idler plates 106, 108 may be vertically and/or horizontally adjustable with respect to the mounting plate 35 for insertion, removal, adjustment, or cleaning of the drive belt 68.

Figure 4:
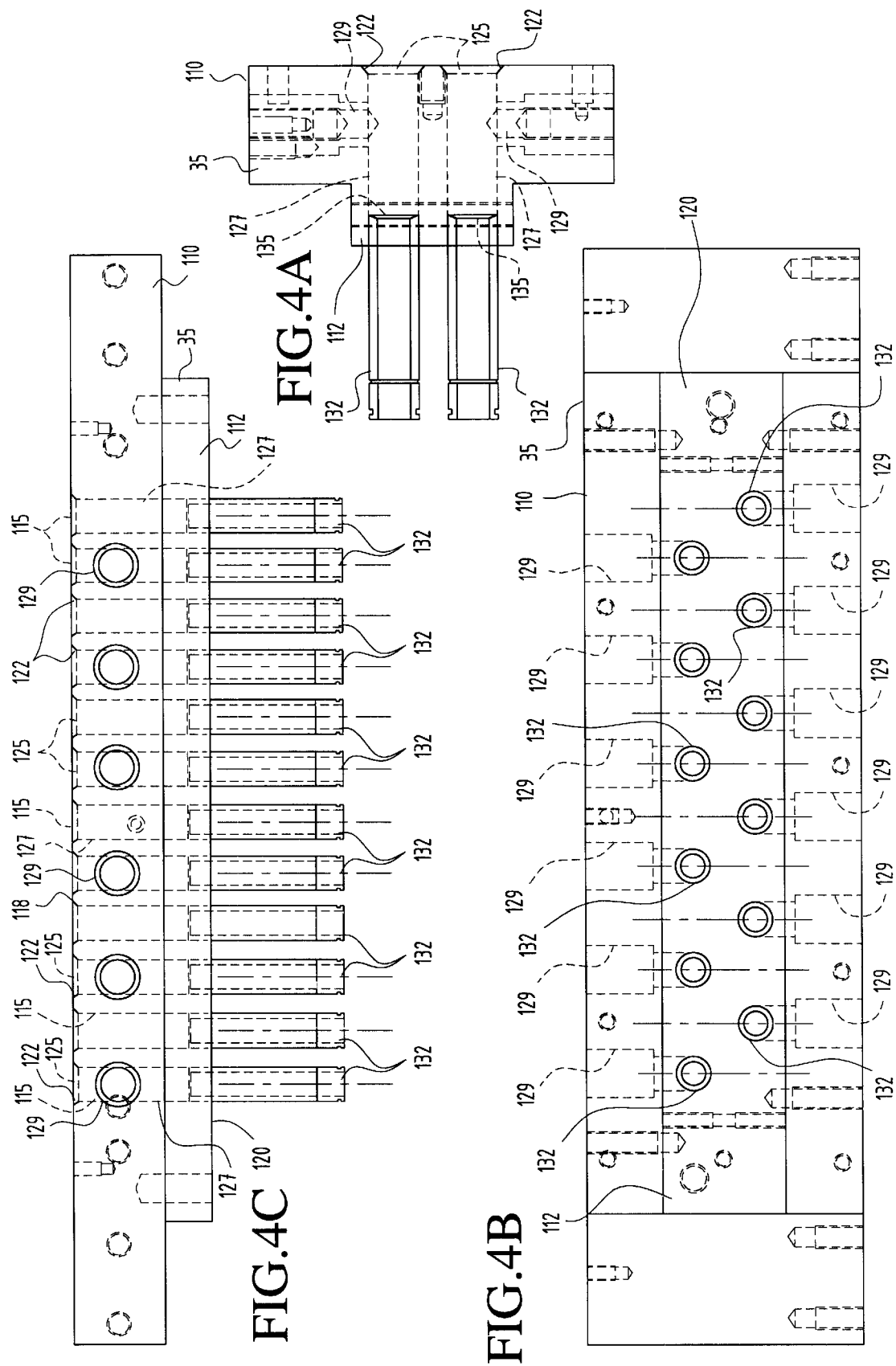
FIG. 4A is a side view of the horn assembly or manifold plate containing extruder pipes of the twist head apparatus of the present invention.
FIG. 4B is a front or downstream end elevational view of the manifold plate or horn assembly and extruder pipes of FIG. 4A.
FIG. 4C is a top view of the horn assembly or manifold plate and extruder pipes of FIG. 4A.

As shown in FIGS. 4A, 4B, and 4C, the horn assembly or manifold plate 35 is "T"-shaped in cross section. It includes a main rectangular portion 110 and a substantially centrally located protruding rectangular portion 112. The horn assembly or manifold plate 35 may include various bores for bolting or attachment of the upper and lower idler plates 106, 108 and upper and lower valve plates 102, 104.

The dough passageways 115 extend from an upstream side 118 of the manifold to a downstream side 120 of the manifold 35 through the main rectangular portion 110 and the protruding portion 112. Each passageway 115 may contain one or two internal chamfers, beveled edges, or flares 122. The upstream most chamfer extends from the upstream surface 118 of the manifold plate 35 a short distance towards the downstream end 120 of the manifold plate 35. The first chamfer may lead into a second chamfer. The first and second chamfers provide dough passageway inlets 125 which are widest at the upstream or receiving surface 118 of the manifold plate 35 so as to minimize dead areas on the manifold plate's upstream surface 118. The chamfer angle may range, for example, from about 30° to about 45° with respect to the upstream manifold surface 118. The chamfers 122 lead to a narrow, cylindrical passageway 127 which extends to the downstream or output end 120 of the manifold plate 35. Each of the narrow, cylindrical passageways 127 may intersect with a substantially perpendicular bore 129. The flow restrictor or adjustable bolt or valve 100 may thereby extend through the bore 129 into the cylindrical passageway 127 for adjusting or controlling the flow through each dough passageway 127. For example, turning of the flow restrictor 100 within the bore 129 may serve to reduce or increase the cross-sectional area of the dough passageway 127.

As shown in FIGS. 4A, 4B, 4C, and 5 an extruder pipe or hollow cylindrical shaft or tube 132 is inserted into the downstream end of the cylindrical dough passageway 127. The extruder pipes 132 are press fit and gas tungsten arc welded into the protruding portion 112 of the manifold plate 35 so that the pipes 132 do not rotate, but rather remain stationary, and prevent leakage of the dough from the manifold plate 35. The extruder pipes 132 may include a chamfer 135 at their upstream end to provide a smooth transition or flow of dough from the dough passageway 127 into the extruder pipe 132.

A substantial portion of each extruder pipe 132 extends outside of the manifold plate 35 so as to accommodate a rotary gear sprocket or drive gear 70 and rotary die cup 135 which are mounted on each extruder pipe 132 as shown in FIGS. 4A, 4B, 4C, 5, 6, and 6A. Each extruder pipe 132 may include a retaining ring groove 134 in its outer surface for accommodating a retaining ring or ring clip 136. The retaining ring 136 may be metallic, such as stainless steel, and contain a slit for placement or clipping of the ring into the retaining ring groove 134. The retaining ring or ring clip 136 retains a downstream bushing 138. The downstream bushing 138 may be made of plastic, such as nylon or TEFLON or Delrin. The downstream bushing 138 and the retaining ring 136 retain a plastic (e.g. nylon or TEFLON or Delrin) sleeve or bushing or twist sprocket bearing 140 and rotary gear drive 70 and die cup 135. The downstream bushing 138 helps to reduce friction and resist abrasion between the retaining ring 136 and the rotary drive gear 70 and twist sprocket bearing 140. The retaining ring 136 and the downstream or retaining bushing 138 prevent substantial movement or traveling of the rotary gear 70 along the extruder pipe 132 while permitting rotational movement of the die cup 135 about the longitudinal axis 142 of the extruder pipe 132.

An O-ring groove 144 may be included downstream of the retaining ring groove 134. The O-ring groove 144, located in the outer surface of the extruder pipe 132, may accommodate a rubber ring seal 146 to help prevent back-flow of dough between the outer surface of the extruder pipe 132 and the inner surface of the rotatable die cup 135 or nozzle 54 back towards the rotatable gear 70. In embodiments of the invention, the extruder pipe 132 may contain a plurality of O-ring grooves 144 and rubber ring seals 146 for dough back-flow prevention. The one or more O-ring seals 146 help to reduce or prevent longitudinal or transverse relative movement between the extruder pipe 132 and the die cup 135 while permitting rotational movement of the die cup 135 about the longitudinal axis 142 of the extruder pipe 132.

Figure 5:
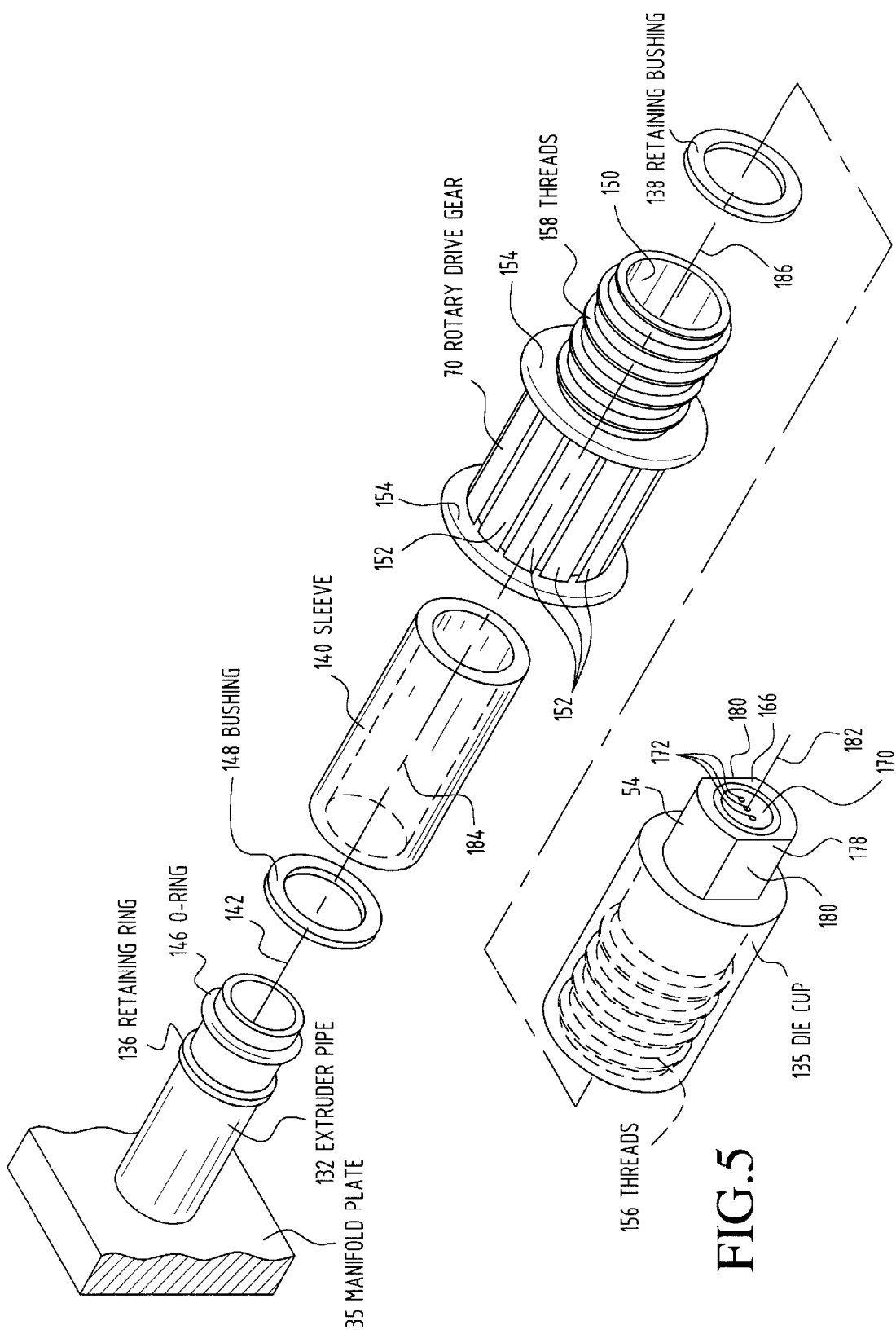
FIG. 5 is an exploded, perspective view of a rotating nozzle assembly of the twist head apparatus of the present invention.
Figure 6:
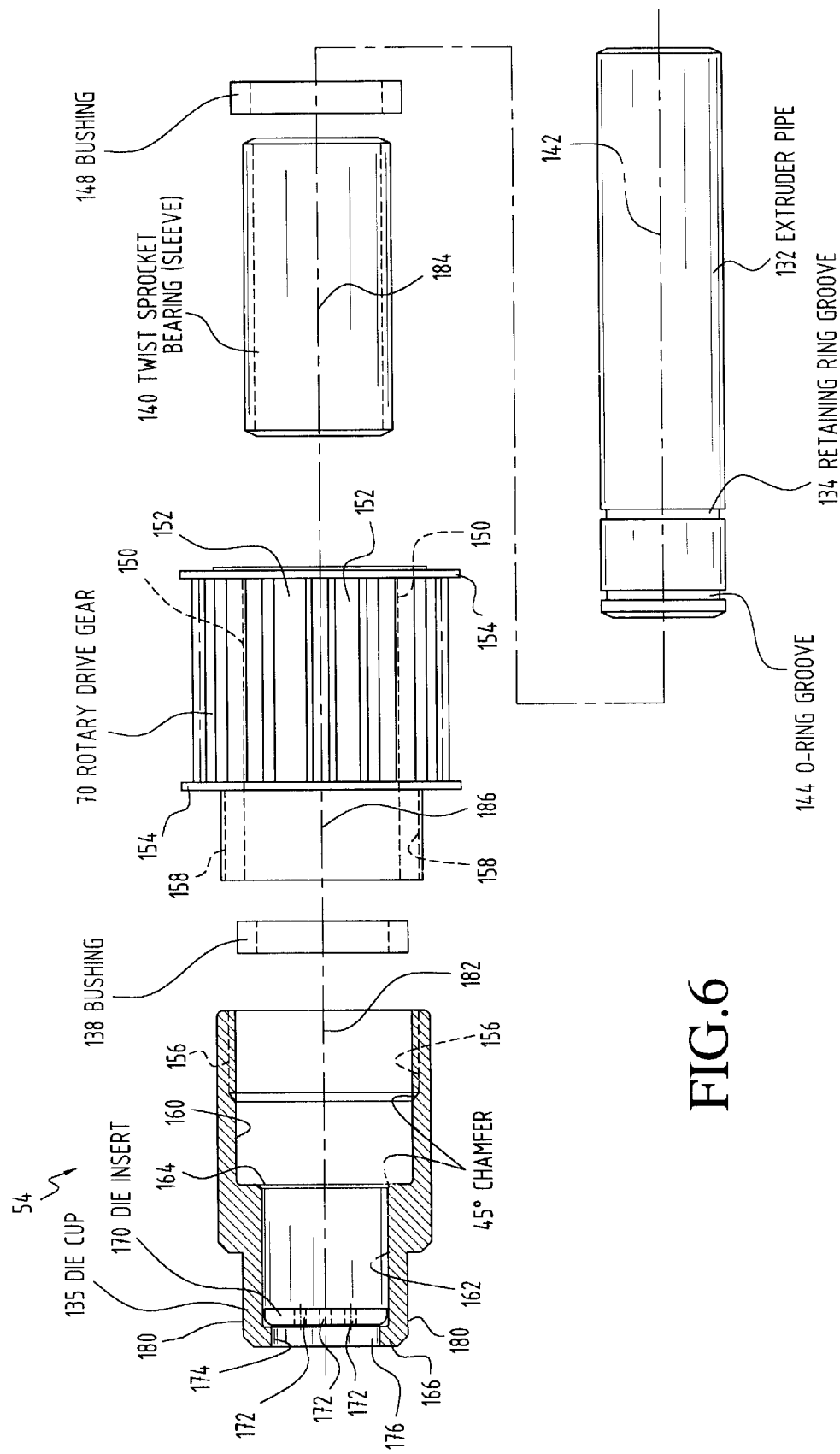
FIG. 6 is an exploded side view of the rotatable nozzle assembly.
Figure 6A:
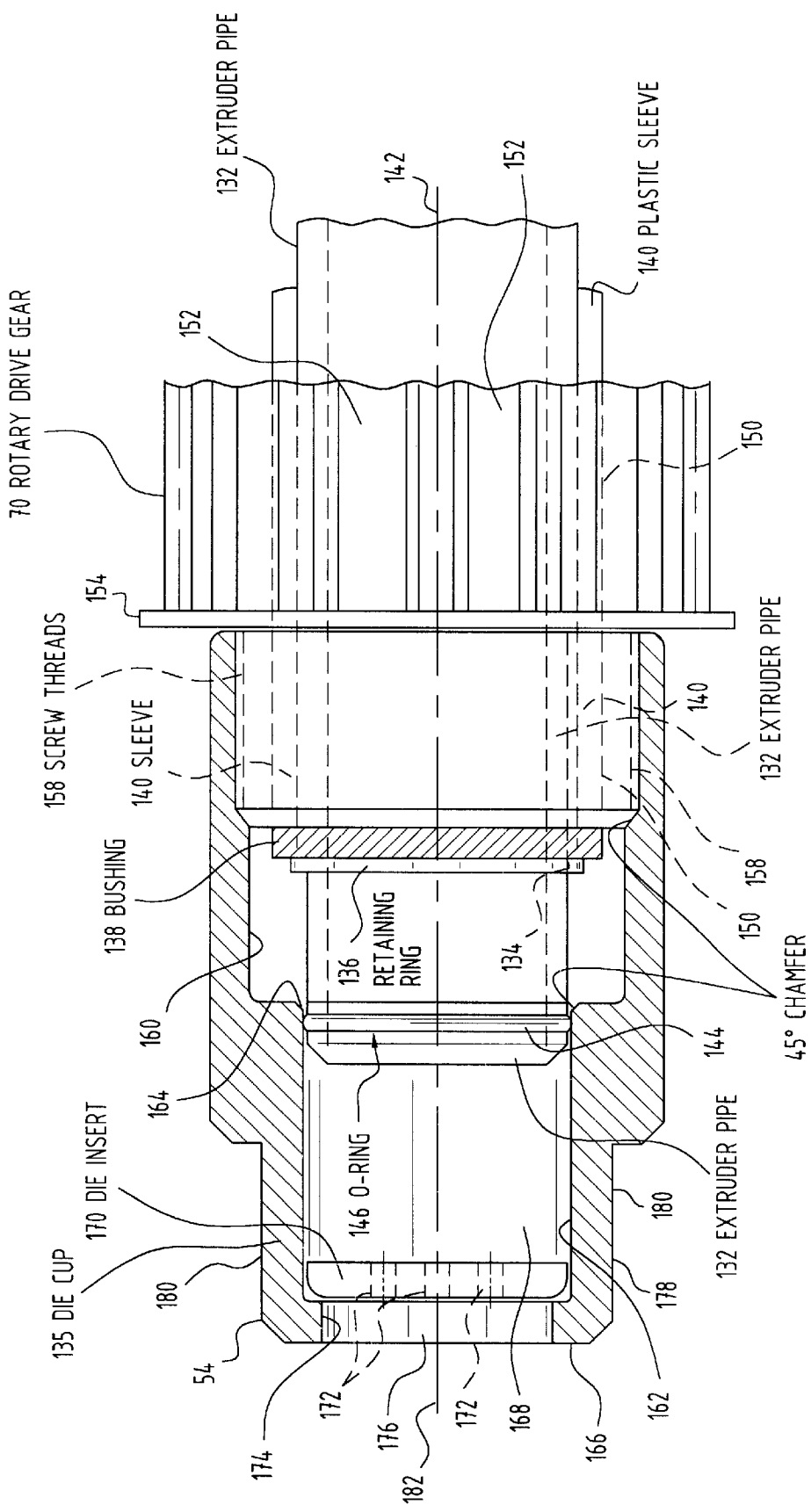
FIG. 6A is a partially exploded side view of the rotatable nozzle assembly of FIG. 6 showing positioning of the extruder pipe, O-ring seal, retaining ring, and retaining bushing within the die cup when assembled.

As shown in FIGS. 5, 6, and 6A, the nozzle assembly 54 includes a die cup or insert cup 135 which is screwed onto or fixedly attached to the rotatable gear 70. A low-friction plastic bushing 148 is inserted on the extruder pipe 132 between the manifold plate 35 and the rotatable gear 70. This upstream plastic bushing 148 reduces frictional forces and abrasion between the rotating gear 70 and the manifold plate 35. The upstream plastic bushing 148 may be made of nylon, TEFLON, or Delrin.

Also inserted on the extruder pipe 132 is a low-friction plastic sleeve 140 upon which the rotatable gear 70 is placed. Both the plastic sleeve 140 and the rotatable gear 70 rotate about the central longitudinal axis 142 of the extruder pipe. The plastic sleeve or bearing 140 may be press fit or snugly fit into the inner bore 150 of the rotary gear 70 so that upon rotation of the gear 70, the sleeve 140 and gear 70 do not rotate relative to one another. The rotary gear 70 contains a plurality of teeth 152 around its periphery for engagement with the toothed gear belt 68. Circumferential ridges 154 are provided to prevent slippage of the belt 68 or lateral movement of the belt 68.

The rotatable die cup 135 includes internal screw threads 156 for engagement with the external screw threads 158 of the rotatable gear 70. The orientation of the threads 156, 158, e.g. left-hand or right-hand, may be such so as to be opposite to or to hinder loosening upon rotation. The rotatable die cup 135 includes a large upstream bore 160 and a smaller downstream bore 162. A chamfer 164 is provided for transition from the upstream bore 160 to the downstream bore 162. When the die cup 135 is fully screwed onto the rotary gear 70, the extruder pipe 132 extends into the narrower bore 162 of the die cup 135 but terminates substantially upstream from the die insert or die orifice end 166 so as to create a headspace 168 as illustrated in FIG. 6A. As shown in FIG. 6A, the O-ring groove 144 of the extruder pipe 132 and the O-ring seal 146 are located within the narrower, downstream bore 162 of the die cup 135. The internal diameter of the die cup 135 in the downstream bore or chamber 162 is within close tolerance of the outer diameter of the extruder pipe 132 so as to snugly accommodate O-ring seals 146 and reduce back-flow of dough.

As shown in FIG. 6A, when the die cup 135 is securely assembled on the rotary drive gear 70, the retaining ring groove 134, the retaining ring 136, and the retaining bushing 138 are located within the wider, upstream bore 160 of the die cup 135. The internal diameter of the die cup 135 in the upstream bore or chamber 160 is slightly larger than the outer diameter of the retaining ring 136 and retaining bushing 138 so as to avoid contact between the die cup 135 and the retaining ring 136 and bushing 138.

The replaceable die insert 170 containing die orifices 172 is placed against a downstream lip or ridge 174 formed by a narrower bore 176 at the downstream end 166 of the die cup 135. The end portion 178 of the cylindrically shaped die cup 135 may be provided with opposing straight portions 180 for engagement by a wrench.

When assembled, the rotatable die cup 135, the rotatable sleeve or bearing 140, and the rotatable gear 70 have their central longitudinally axes 182, 184, 186, respectively, all aligned with the central longitudinal axis 142 of the extruder pipe 132.

As shown in FIG. 7, the idler gear assembly 188 includes an idler gear 72 containing teeth 190 and circumferential guides 192 for guiding and retaining the toothed belt drive 68. The idler gear 72 may have the same teeth dimensions, width, and diameter as the rotary drive gear 70. The idler gear assembly 188 includes a plastic sleeve 194 which is press fit or snugly fit within the central bore 196 of the idler gear 72. The plastic sleeve or bearing 194 and the idler gear 72 are mounted on and rotate about a stud 198. The stud 198 is threaded at one end for securing the stud 198 to an idler plate 104 or 106 of the twist head apparatus 7. A plastic bushing 200 may be inserted on the stud 198 between the head 202 of the stud 198 and the idler gear 72. A plastic bushing or washer 204 may also be inserted on the stud 198 between the idler gear 72 and the idler plate 104 or 106 for reducing friction. The head 202 of the stud 198 may include a hexagonally shaped bore 206 for tightening or screwing of the stud 198 into the idler plate 104 or 106.

Figure 8A:
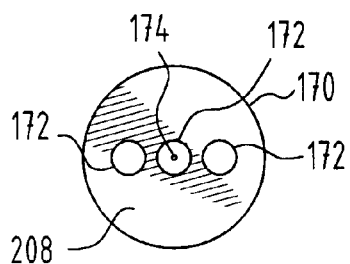
FIGS. 8A and 8B are front and back views of a preferred die insert for making twisted breadsticks in accordance with the present invention.
Figure 8B:
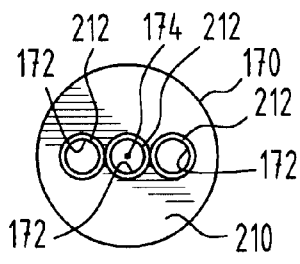

As shown in FIGS. 5, 6, 6A, 8A and 8B, a preferred die insert 170 for making twisted breadsticks in accordance with the present invention includes three circular die orifices 172 essentially equal in diameter and linearly aligned. The center of the middle die orifice 172 may be at least substantially aligned with the center 174 of the die insert 170 and the longitudinal axis 182 of the die cup 135. As shown in FIG. 8A, the downstream or exit end 208 of the die insert 170 may be substantially flat. As shown in FIG. 8B, the inlet or upstream end 210 of the die orifices 172 preferably include a chamfer 212 to provide smooth flow through the die orifices 172.

Figure 9A:
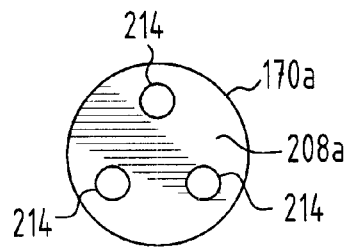
FIGS. 9A through 9J show various die insert designs which may be employed in the twist head apparatus of the present invention.
Figure 9B:
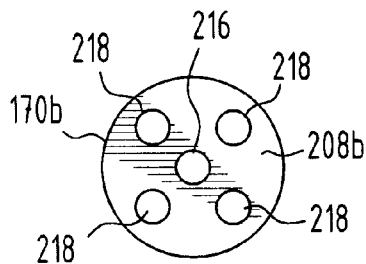
Figure 9C:
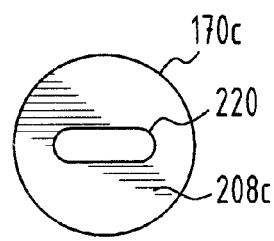
Figure 9D:
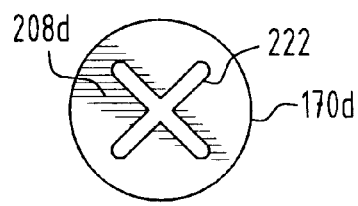

Other die inserts which may be employed for producing twisted baked goods in accordance with the present invention are shown in FIGS. 9A through 9J. FIG. 9A shows a three-hole die insert 170a with the die orifices 214 arranged in a triangular pattern. A five-hole die insert 170b is shown in FIG. 9B. The central die orifice 216 is surrounded by four die orifices 218 located at the corners of a square. FIG. 9C shows a die insert 170c having a single slit 220 which is centered in the die insert 170c. A cross-shaped or X-shaped die orifice 222 is shown in the die insert 170d of FIG. 9D.

Figure 9E:
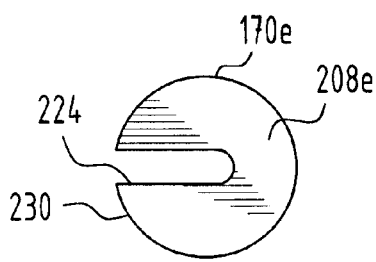
Figure 9F:
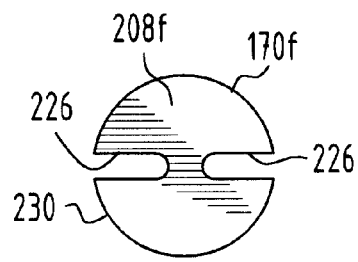
Figure 9G:
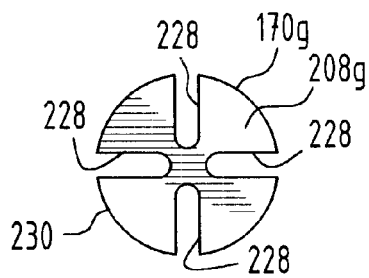

FIGS. 9E, 9F, and 9G show die inserts 170e, 170f, and 170g having a single slit 224, two slits 226, and four slits 228, respectively. The slits 224, 226, 228 extend from a side or outer peripheral edge 230 and terminate beyond (FIG. 9E) or short (FIGS. 9F and 9G) of the center of the die insert 170e, 170f, 170g. In the die insert 170f of FIG. 9F, the two slits 226 are linearly aligned. In the die insert 170g of FIG. 9G, the four slits 228 are substantially perpendicular to each other.

Figure 9H:
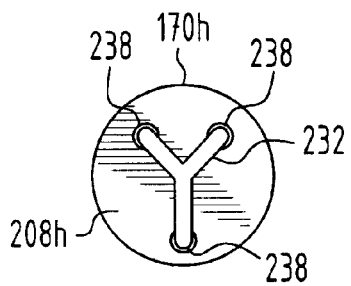
Figure 9I:
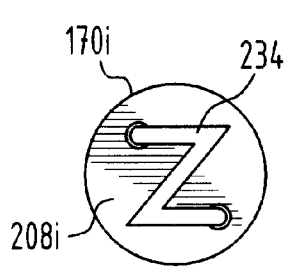
Figure 9J:
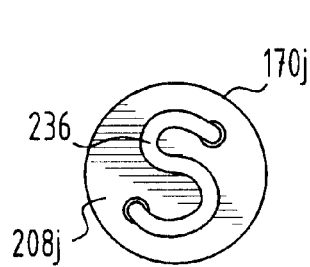

In FIGS. 9H, 9I, and 9J, the die inserts 170h, 170i, and 170j have die orifices 232, 234, and 236 which are Y-shaped, Z-shaped, and S-shaped, respectively. The outlet faces 208a through 208j of the die inserts 170a through 170j of FIGS. 9A through 9J may be substantially flat. The input or upstream surfaces of the die inserts 170a through 170j of FIGS. 9A through 9J may include chamfers to provide smooth flow through the die orifices. The slotted die orifices, and as exemplified in FIGS. 9H, 9I, and 9J, the X-shaped, Y-shaped, Z-shaped, and S-shaped die orifices may include circular shaped chamfers 238 at each of their ends on the downstream die face as well as the upstream die face.

Figure 10:
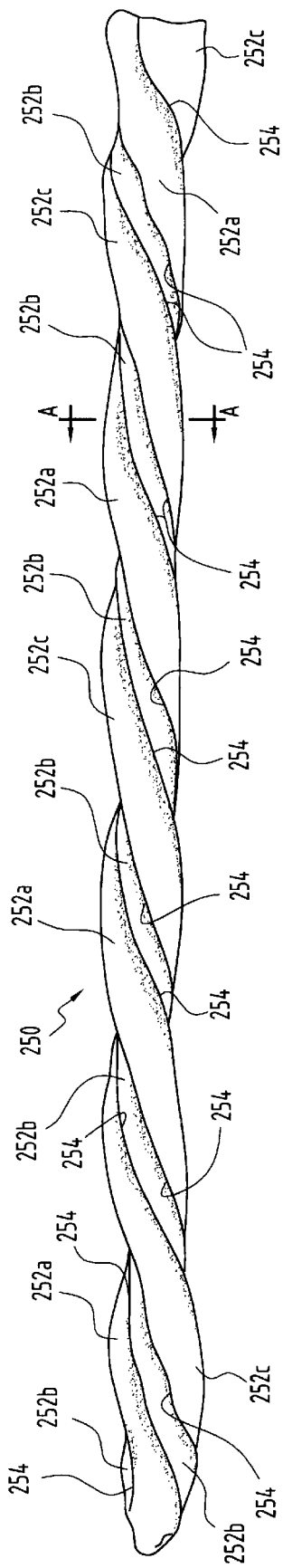
FIG. 10 shows a preferred breadstick made with a three-hole die insert as shown in FIGS. 8A and 8B.
Figure 11:
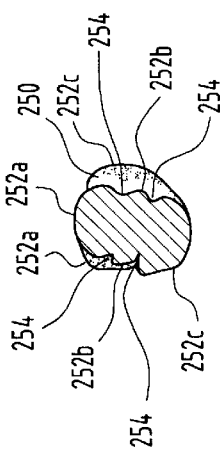
FIG. 11 is a cross-sectional view of the breadstick of FIG. 10 taken along the line A—A.

FIGS. 10 and 11 show a preferred breadstick 250 which may be made using a die insert 170 having three linearly aligned die orifices 172 as shown in FIGS. 8A and 8B. As shown in FIGS. 10 and 11, the twisted breadstick 250 has distinctive peaks 252a, 252b, 252c and valleys 254 which each extend and twist about the central, longitudinal axis of the breadstick 250 at least substantially throughout the length of the breadstick 250. As shown in the cross-section view of FIG. 11, the three dough ropes adhere to each other and provide a unitary cross-section but the twisted external shape and external peaks 252a, 252b, 252c and valleys 254 are retained in the baked product 250. Also, the peaked portions 252a and 252c derived from the outer holes are substantially larger than the peaked portion 252b derived from the central hole of the die insert 170. Thus, the two outer, larger dough ropes 252a and 252c appear twisted about the central, smaller dough rope 252b and provide a unique, three-dimensional appearance. The peaked portions 252a, 252b, 252c include areas of greater browning than the valley areas 254. Also, the larger, outer peak portions 252a, 252c contain more intense brown areas or grill marks than does the central, smaller peaked region 252b thereby providing a desirable, variable, home-baked appearance.

What is claimed is:

1. Apparatus for the production of twisted baked goods comprising:
   a) a conveying device comprising at least one conveying screw or auger for feeding dough,
   b) a pump for receiving dough fed from said conveying device and for pumping said dough to a twist head device, and
   c) a twist head device for twisting said pumped dough into a plurality of twisted dough ropes, said twist head device comprising:
      a manifold having an upstream end and a downstream end, and a plurality of dough passageways each of which extends from said upstream end to said downstream end,
      a stationary extruder pipe inserted into each of said passageways and extending outside said manifold from said downstream end of said manifold, and
      a rotary die cup mounted on each of said extruder pipes and having both an upstream end and a downstream end outside said manifold, each of said die cups being rotatable about said respective extruder pipe wherein dough passes from said dough passageways through said extruder pipes into said rotary die cups, each of said rotary die cups including at least one die orifice through which said dough is extruded,
      wherein rotation of each die cup twists the dough into a twisted dough rope.

2. Apparatus as claimed in claim 1 wherein said conveying device is an extruder or a continuous mixer.

3. Apparatus as claimed in claim 1 wherein said conveying device comprises non-intermeshing screws or augers.

4. Apparatus as claimed in claim 1 wherein said pump is a positive displacement pump.

5. Apparatus as claimed in claim 1 wherein each die cup comprises a plurality of die orifices.

6. Apparatus as claimed in claim 1 further comprising a conveyor belt for receiving said twisted dough ropes from said twist head device, a cutter for cutting said twisted dough ropes into pieces, and an oven for baking said pieces.

7. Apparatus for producing a twisted food product comprising:
- a manifold having an upstream end and a downstream end, and a plurality of dough passageways each of which extends from said upstream end to said downstream end,
- a stationary extruder pipe inserted into each of said passageways and extending outside said manifold from said downstream end of said manifold, and
- a rotary die cup mounted on each of said extruder pipes and having both an upstream end and a downstream end outside said manifold, each of said die cups being rotatable about said respective extruder pipe wherein dough passes from said dough passageways through said extruder pipes into said rotary die cups, each of said rotary die cups including at least one die orifice through which said dough is extruded,
- wherein rotation of each die cup twists the dough into a twisted dough rope.

8. Apparatus as claimed in claim 7 wherein each extruder pipe includes a rotatable gear which rotates about the respective extruder pipe, and each rotary die cup is attached to the respective rotatable gear so that rotation of the respective rotatable gear rotates the respective die cup about the respective extruder pipe.

9. Apparatus as claimed in claim 8 wherein each die cup includes a plurality of die orifices through which the dough is extruded into a plurality of dough ropes, at least one of the die orifices in each die cup being eccentric to an axis of rotation of the die cup so that the plurality of dough ropes extruded from each die cup are twisted into a single twisted dough rope upon rotation of each die cup.

10. Apparatus as claimed in claim 8 wherein each of the rotatable gears are driven by a common drive belt.

11. Apparatus as claimed in claim 8 wherein each of said rotatable gears includes an external threaded portion, each of said die cups includes an internal threaded portion, for engagement with the external threaded portion of the respective rotatable gear.

12. Apparatus as claimed in claim 8 wherein each extruder pipe terminates within each die cup so as to provide a headspace between the downstream end of the extruder pipe and the at least one die orifice of the die cup.

13. Apparatus as claimed in claim 12 wherein each extruder pipe includes a plastic sleeve to facilitate rotation of said rotatable gear about said extruder pipe, and said each die cup contains a die insert located at its downstream end, said at least one die orifice being located in said die inserts.

14. Apparatus as claimed in claim 8 wherein a ring seal is provided on the outer surface of each extruder pipe to prevent backflow of dough between said extruder pipe and said die cup.

15. Apparatus as claimed in claim 7 wherein an inlet end of each of said dough passageways is beveled and a compression head is mounted on said manifold and houses or covers the inlet ends of the dough passageways.

16. Apparatus as claimed in claim 7 wherein each die cup contains three linearly arranged die orifices, wherein a rotational axis of the middle die orifice is substantially located at a rotational axis of the die cup.

17. Apparatus for producing a twisted food product, comprising:
- a manifold having an upstream end and a downstream end, and a plurality of dough passageways each of which extends from said upstream end to said downstream end;
- an extruder pipe inserted into each of said passageways and extending from said downstream end of said manifold;
- a rotatable gear which rotates about said respective extruder pipe, wherein each of said rotatable gears includes an external threaded portion; and
- a rotary die cup mounted on each of said extruder pipes, each of said rotary die cups having an internal threaded portion for engagement with the external threaded portion of said respective rotatable gear so that rotation of a rotary gear rotates said respective rotary die cup about said respective extruder pipe;
- wherein dough passes from said dough passageways through said extruder pipes into said rotary die cups, each of said rotary die cups including at least one die orifice through which said dough is extruded, and
- wherein rotation of each rotary die cup twists the dough into a twisted dough rope.

* * * * *